United States Patent Office 3,159,039
Patented Dec. 1, 1964

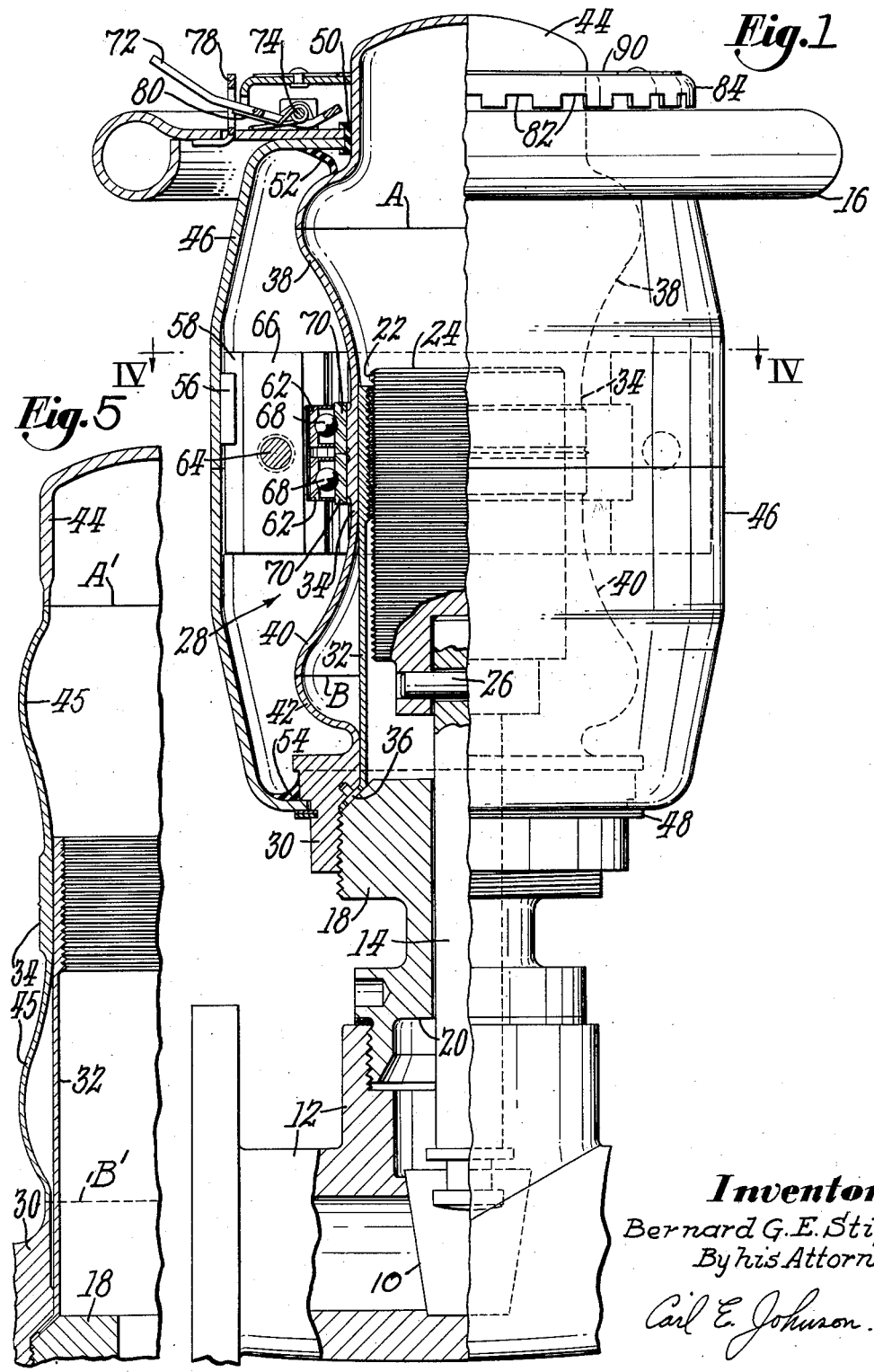

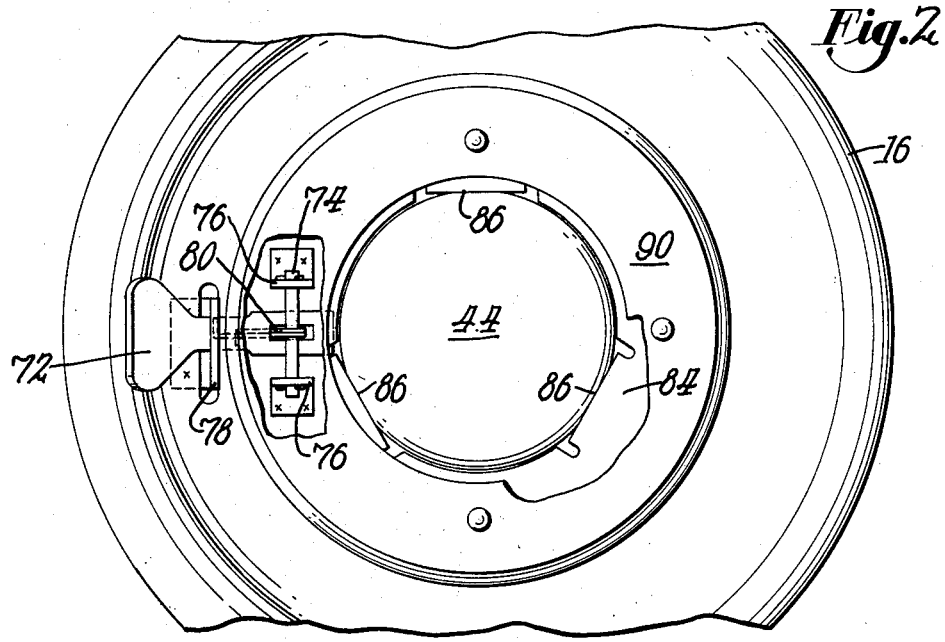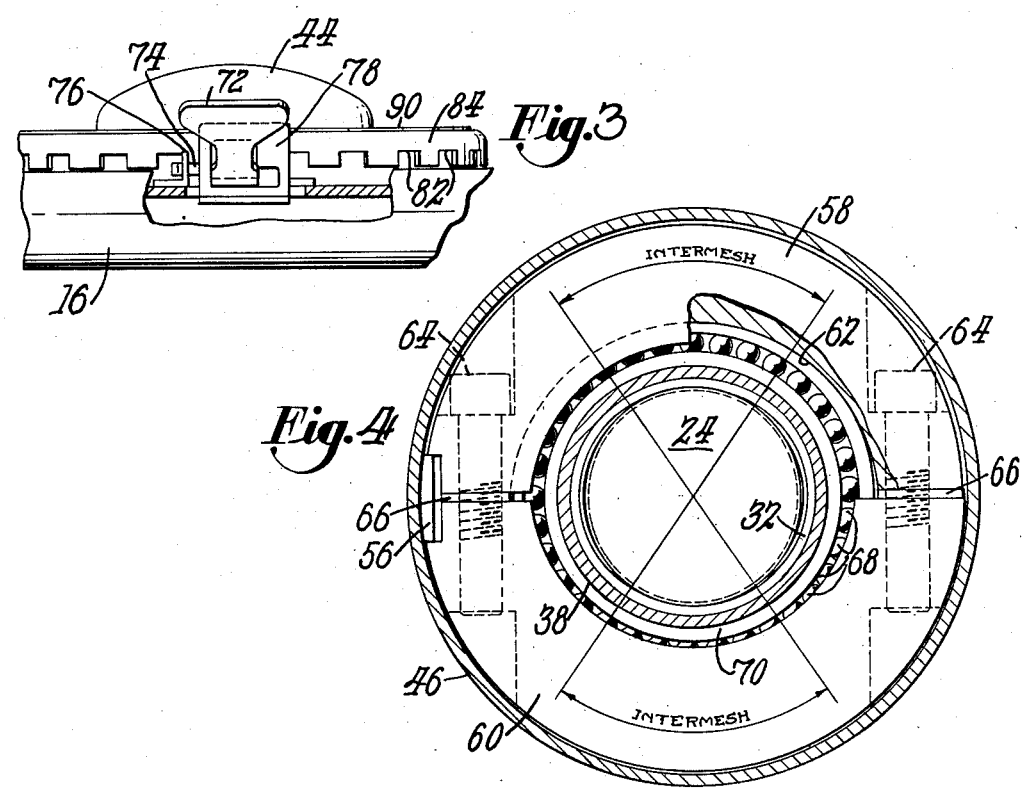

3,159,039
HERMETICALLY SEALED ACTUATORS FOR VALVES AND THE LIKE
Bernard G. E. Stiff, Lynnfield Center, Mass., assignor to United Shoe Machinery Corporation, Flemington, N.J., a corporation of New Jersey
Filed Feb. 19, 1962, Ser. No. 174,099
6 Claims. (Cl. 74—17.8)

This invention relates to hermetically sealed actuators, and more especially to a manually operable actuator adapted to control, from outside a closed or sealed wall, the movement of an element such as a valve stem, a guide rod, tool holder, or other object on the inside of the wall. While the invention is herein illustrated as embodied in an actuator for a valve, it will be appreciated that the invention is not thus limited in use nor is it restricted to the particular construction herein shown.

It has hitherto been proposed, as disclosed in United States Letters Patent No. 2,883,150, issued April 21, 1959, on an application filed in the name of C. W. Musser, to operate a rotary valve by means of gear teeth which are operated from outside a deflectable cylindrical wall. As therein described a strain inducer is arranged to be moved about this wall to propagate a rotary strain wave therein and thus to cause gear teeth on the wall to be maintained in spaced mating relation with teeth on the valve and causing its rotation. While a strain inducer, commonly known as a wave generator, has accordingly been applied directly to a cylindrical conduit to control fluid flow, it is a primary object of this invention to provide a more generally useful type of sealed actuator of compact and economical construction insuring reliable, safe, and easy operation under conditions of even a high pressure or load.

In keeping with the object just stated and as a feature of this invention, there is provided, in combination with a toothed member the movement of which is to be effected, a novel actuator means including spaced inner and outer body shells coaxial with the member, the inner shell being radially flexible and having two portions spaced axially which, along at least a part of their length, are elliptoidal in cross sections which have progressively changing major diameters, one of these portions enclosing an end of the member, an intermediate portion of the inner shell being disposed in parallel relation to the teeth of the member for cooperation therewith, a wave generator arranged and adapted to be operatively connected to the inside of the outer shell to impose a rotary wave of radial deflection upon the intermediate portion of the inner shell to transfer localities of tooth engagement peripherally about the member, and means for rotating the outer shell in sealed relation on the inner shell whereby the member is actuated with respect to the latter. It will be appreciated that an actuator of this type advantageously employs the general principles of strain wave gearing more fully described in United States Letters Patent Nos. 2,906,143 and 2,943,508, issued September 29, 1959, and July 5, 1960, on applications filed in the name of C. W. Musser. The device of the present invention accordingly retains the usual benefits of high output for weight, and practically non-existent back lash, and additionally incorporates the safety of a double-walled construction which is compact and capable of withstanding high working stresses. Moreover, the unique configuration of the so-called "double bell-shaped" inner shell or wall is such that, while highly resistant to fluid pressure, it may be considerably shorter than the deflectable cylindrical wall shown in the Musser Patent 2,883,150 referred to above, it enjoys longer bearing life, may be shaped directly from tubing, and is more easily operable, requiring lower starting torque.

The foregoing and other features of the invention, together with various novel details of construction and arrangement of parts, will now be more particularly described in connection with an illustrative embodiment and with reference to the accompanying drawings thereof, in which:

FIG. 1 is a semi-sectional view of a hermetically sealed, manually operable actuator for a gate valve;
FIG. 2 is a plan view of the actuator shown in FIG. 1, a portion being broken away to show latch mechanism;
FIG. 3 is a detail view in side elevation of the latch mechanism of FIGS. 1 and 2;
FIG. 4 is a section taken on the line IV—IV of FIG. 1 and indicating the mode of assembly as well as elliptoidal configurations in the vicinity of operating teeth; and
FIG. 5 is a partial section of a modified inner wall or flexspline of an actuator.

Referring to FIG. 1, the invention will be described as adapted to actuate a valve of the gate type, a gate 10 being shown in seated or down position in a conduit 12. The device is accordingly illustrated as embodying a rotary to linear variation of a harmonic drive, though it will be apparent that for other types of valves or for other elements to be operated rotationally the device may, without departing from the scope of the invention, embody a suitable rotary-to-rotary variation of harmonic drive. The gate 10 is secured on one end of a value stem 14 to be moved axially by suitable means such as a hand wheel 16 (FIGS. 1–3) mounted as later explained. An adapter 18 threaded into the conduit 12 slidably receives the stem 14, serves as a thermal barrier, has an internal shoulder 20 for limiting removal of the gate from its seat, and supports the actuating means next to be described.

For cooperating with circumferential grooves or splined teeth 22 formed on a cylinder 24 that is secured by a pin 26 to the stem 14, a preferably composite, tubular flexspline 28 of unique shape is employed. This flexspline has a base 30 threaded onto the adapter and, in this instance, to facilitate manufacture includes a radially flexible sleeve 32 an end portion of which is internally threaded to cooperate with the spline teeth 22. The threads of the sleeve have the same pitch as the teeth 22 but the lead or helix angle of the threads or teeth on the sleeve is (for the purpose of deriving relative linear motion) different from that of the spline teeth 22, the latter in this case preferably being of zero lead. As shown in FIG. 4 the sleeve 32, though initially of circular transverse section throughout its length, has its teeth radially deflected, by wave generator means later described, to engage at peripherally opposed localities with the spline teeth 22 and be out of engagement and out of mesh at intermediate peripheral localities. It should be noted that, if desired, the sleeve 32 may be omitted and its teeth formed instead directly on an intermediate portion 34 of the flexspline which is disposed in parallel relations to the spline teeth 22 for cooperation therewith. When the sleeve is used it is secured against relative rotation by means of a series of pins 36 (one only shown in FIG. 1), the heads of which lie within an outwardly flared circular end of the sleeve and the shanks of which project into the flexspline base 30.

As illustrated in FIG. 1 the flexspline 28 or inner wall of the actuator is in the form of a thin, symmetrical shell coaxial with the cylinder 24 and the stem 14, and has two radially flexible, axially spaced portions 38, 40 which, along at least a considerable part of their lengths, are elliptoidal in cross section. The diameters of these cross sections progressively change in length from that of the intermediate portion 34. While the shapes of the portions 38, 40 are not necessarily alike, it is also true that their diameters need not, in directions extending from the portion 34, first progressively increase and then decrease though this arrangement is usually preferred. Some advantages of employing a bell-shaped contour in a flexspline, i.e. deriving parallel toothed motion and reducing flexspline stresses are disclosed in a copending application, Serial No. 108,600 (now Patent No. 3,091,979), filed May 8, 1961, in the names of Hans F. Schaefer, Jr., and Frederic B. Jennings, but diminution to zero of both radial and axial displacement is not there treated. The intermediate portion 34 is only radially deflected during rotation of the wave generator. The flexspline portions 38, 40 respectively, comprise axially spaced portions of negative curvature which merge with zones of positive curvature. By "negative curvature" is meant a shape or surface having centers of curvature on its opposite sides, whereas "positive curvature" characterizes a surface having centers of curvature on only one side thereof. By reason of this axial transformation of curvature from negative to positive the portions 38, 40 respectively undergo decreasing radial deflection axially away from the portion 34, and undergo first increasing and then decreasing components of axial displacement until at their remote ends they experience little or no displacement component radially or axially. The portions 38, 40 are respectively welded as shown by lines A and B (FIG. 1), to blend and merge with substantially stationary end mounting portions 44, 42 respectively of the flexspline. The portion 44 is shaped to serve as a cap enclosing an end of the valve stem 14 and its cylinder 24, and the open portion 42 is integral with the base portion 30.

FIG. 5 shows a modified shape of flexspline having a greater length than the flexspline 28 and of less bulbous form whereby, in remote terminal zones of negatively-positively curved portions 45, 45 adjoining the end mountings 30 and 44 (adjacent weldments B′, A′) displacement will more nearly approach zero than in the flexspline 28 despite a greater internal pressure.

Mounted for rotation upon the flexspline about its axis is an outer protective casing or tubular wall 46 one inturned end of which is held against an external shoulder of the base 30 by means of a snap ring 48 (FIG. 1). The outer end of the wall 46 is secured as by spot welding to the hand wheel 16. The latter and the last-mentioned end portion of the wall 46 have their inner rims retained in the circular channel of a Teflon strip 50 (FIG. 1) adapted to fit snugly on the portion 44. As an added precaution against leakage due to fracture of the inner or deflectable wall portions of the flexspline 28, annular seals 52, 54 of Teflon or other suitable material hermetically enclose the space between the flexspline and the outer wall 46.

As illustrated in FIGS. 1 and 4, wave generator means is arranged to be rotated by the hand wheel 16 to cause the intermediate flexspline portion 34 to impart to the toothed portion of the sleeve 32 a rotary wave of radial deflection. For this purpose the wave generator preferably comprises a pair of bearings of normally circular configuration which have been made elliptoidal as will now be explained. Secured to the outer wall 46 by means of a key 56 are radially spaced halves 58, 60 of a normally exactly circular ring having an internal diameter slightly less than the outside diameter of a normally circular grooved outer race 62 of the bearing. Recessed clamping bolts 64, 64 extending into both halves 58, 60 respectively, and threaded into one of these, are disposed to extend through shims 66, 66 respectively of carefully selected thickness. The arrangement is such that when the bolts clamp the halves 58, 60 against opposed sides of the inserted shims, the outer race 62 is forced to assume an elliptoidal shape which is transmitted through roller elements such as balls 68 and imparted to a grooved inner race 70 arranged to bear, at diametrically opposed localities, on a central area of the intermediate flexspline portion 34. Accordingly, as indicated in FIG. 4, the teeth of the sleeve 32 are, in the locality of the minor axis, urged into contact or intermesh with the circumferential grooves or spline teeth 22. As the wave generator rotates, the minor and major axes of the bearing rotate. Each rotation of the wave generator thus axially moves the valve stem relative to the actuator a distance equal to the difference in lead of the spline teeth 22 and the teeth of the sleeve 32 (or of the flexspline when formed thereon). It will be apparent that other wave generator constructions may be substituted for that shown, and that suitable materials including a variety of metals and/or elastomers may be employed.

For securing the hand wheel and hence the gate 10 in selected operating position, it is normally desirable in view of the ease with which changes in position may usually be effected manually to provide a latching mechanism, for instance of the type now to be described. A radially disposed latching lever 72 (FIGS. 1, 2 and 3) is pivotally supported on a pin 74 journaled in ears 76, 76 on the hand wheel. The lever 72 extends through a slot in a tab 78 secured to the hand wheel, and a torsion spring 80 on the pin 74 is arranged to urge the lever into any one of a series of spaced notches 82 of an annulus 84. The latter is held against rotation relatively to the cap 44 by means of triangularly arranged flats 86 (FIG. 2) formed on the annulus and registering with corresponding flat external portions of the cap. Thus, in resetting the valve it is only necessary to depress the outer end of the lever against resistance of the spring and release the lever for relatching after appropriately turning the hand wheel. If it is desired to keep the hand wheel unlatched, the handle of the lever 72 may be laterally urged into a detent portion of the slot formed in the tab 78 and thus prevented from latching in a notch 82. A plate 90 may be secured on the annulus 84 for bearing suitable indicia including, for instance, the direction in which the hand wheel should be rotated for closing or opening the gate 10.

Operation of the actuator will be fully understood from the foregoing, certain features and characteristics now being particularly noted. In the construction shown the bearings of the wave generator 28 are mounted on the flexspline portion 34 prior to expanding the bulbous portions 38, 40 which, in the illustrative example, are both of greater diameter than the bearings, although this relation need not necessarily obtain. The respective portions 38, 40 or 45, 45 by reason of their configurations of axially changing curvature with respect to an aixs of symmetry may be said to be characterized as having merging negative and positive curvature, i.e. having along two spaced annular parts centers of curvature lying one on the external side and one on the inner side and having along another annular part centers of curvature lying one on the external side and one on the inner side and having along another annular part centers of curvature on only one side. It is the radial flexibility of these curved thin-shell supporting walls which enables the teeth of the flexible sleeve 32 to mesh properly throughout their axial length at the minor axis with the teeth 22, the intermediate portion 34 always deflecting radially and parallel to itself. Such deflection avoids concentration of gear stresses due to "coning," which is the tendency of opposite elements of a cylinder to become non-parallel when an end thereof is distorted into non-circular shape. Moreover, the combination positively-negatively curved shapes of the portions 38, 40 is such that, during operation under loads, at points along the periphery of positive curvature there occurs substantially only axial deflection (known as "scalloping") from a plane transverse to the axis of symmetry, and at the remote peripheries of junction with the end portions 42, 44 all radial and axial components of displacement have attenuated substantially to zero. Without such shaped flexsplines, and more particularly in the case of rigid cylindrical mountings such as disclosed in the afore-mentioned Musser Patent 2,883,150, scalloping is prevented and damaging fracture may be expected. The degree of convex curvature in the portions 38, 40 may change as desired in different applications to accommodate the degree of pressure to be contained and the desired thickness or stiffness of the particular flexspline material employed.

Having thus described my invention, what I claim as new and desire to secure by Letters Patent of the United States is:

1. A sealed actuator for valves and the like having a toothed, internal member to be moved and precisely positioned thereby, comprising radially spaced inner and outer body shells coaxial with the member, the inner shell having two radially flexible portions spaced axially which, along at least a part of their length, are elliptoidal in cross sections which have progressively changing major diameters, one of these portions enclosing an end of the member, a third portion of the inner shell intermediate the two portions being supported thereby in parallel relation to the teeth of the member for cooperation therewith, an elliptoidal wave generator operatively connected to the outer shell to impose a rotary wave of radial deflection upon the intermediate portion of the inner shell to transfer localities of tooth engagement peripherally about the member, and means for rotating the outer shell in sealed relation on the inner shell whereby the member is actuated with respect to the latter.

2. An actuator as set forth in claim 1 wherein at least one of the two axial portions of the inner shell has axially arranged annular portions of negative and positive curvature which merge, an extremity of the positively curved portion attenuating to substantially zero displacement.

3. An actuator as set forth in claim 1 having means for latching the outer shell in selected rotary position with respect to the inner shell.

4. The actuator of claim 1 wherein the wave generator includes an initially circular bearing and semi-circular clamping means engageable therewith to impose an elliptoidal shape on the bearing.

5. In an actuator for a toothed member required to be positioned while hermetically sealed, an adaptor in which the member is movable, a casing threadedly mounted on the adaptor, the casing comprising a tubular, non-rotary inner wall and an outer wall rotatable about their common axis, the inner wall including axially spaced, semi globe-like end mounting portions which are in sealed relation to the outer wall and one of which portions is closed, these end portions supporting between them radially deflectable, elliptoidally sectioned portions of the inner wall, the last-mentioned portions having major and minor axes of changing length along the axis of the member except in the vicinity of its teeth where the major and minor axes are substantially constant, a cylindrical sleeve coaxial with the member and having one end non-rotatably mounted within the casing, the other end of the sleeve being disposed to be radially deflectable by the inner wall and formed with peripheral teeth adapted to cooperate with those of the member at circumferentially spaced localities of interengagement, the teeth of the sleeve and of the member being of the same pitch but different lead, and a wave generator means operable by rotation of the outer wall to rotate the elliptoidal shape of the inner wall in its portion of substantially constant major and minor axes whereby rotation of the localities of tooth interengagement is effected through the sleeve to control movement of the member.

6. In an hermetically sealed actuator for a toothed member, an adaptor through which the member is axially movable, a two-walled coaxial casing the inner wall of which is fixedly mounted at an open end on the adaptor and has a closed end surrounding an extremity of the member, the inner wall having radially deflectable, elliptoidal portions supported by its ends, said portions including axially spaced surfaces of negative curvature merging with an intermediate portion disposed in parallel relation to the teeth of the member for cooperation therewith, an elliptoidal wave generator acting on the intermediate portion upon rotation of the outer wall in sealed relation on the inner wall, and, mounted coaxially within the casing, an internally toothed sleeve the teeth of which are disposed radially opposite said intermediate portion of the inner wall and adapted to be deflected thereby for circumferential engagement at spaced peripheral points with the teeth of the member, the teeth of the sleeve and of the member being of the same pitch but different lead.

References Cited in the file of this patent
UNITED STATES PATENTS

| | | |
|---|---|---|
| 2,419,074 | Herbert | Apr. 15, 1947 |
| 2,863,336 | Parstorfer | Dec. 9, 1958 |
| 2,883,150 | Musser | Apr. 21, 1959 |
| 2,906,143 | Musser | Sept. 29, 1959 |
| 2,943,495 | Musser | July 5, 1960 |
| 2,943,508 | Musser | July 5, 1960 |
| 3,077,792 | Kinderman | Feb. 19, 1963 |